United States Patent
Zhong et al.

(10) Patent No.: US 10,459,919 B2
(45) Date of Patent: *Oct. 29, 2019

(54) SYSTEM AND METHOD FOR MINING CATEGORY ASPECT INFORMATION

(71) Applicant: eBay Inc., San Jose, CA (US)

(72) Inventors: Qian Zhong, San Jose, CA (US); Guanglei Song, San Jose, CA (US); Zhaohui Chen, Saratoga, CA (US)

(73) Assignee: eBay Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/375,144

(22) Filed: Dec. 11, 2016

(65) Prior Publication Data

US 2017/0091275 A1 Mar. 30, 2017

Related U.S. Application Data

(63) Continuation of application No. 15/071,309, filed on Mar. 16, 2016, now Pat. No. 9,519,702, which is a
(Continued)

(51) Int. Cl.
*G06F 16/30* (2019.01)
*G06F 16/2453* (2019.01)
(Continued)

(52) U.S. Cl.
CPC .... *G06F 16/24544* (2019.01); *G06F 16/2246* (2019.01); *G06F 16/2282* (2019.01);
(Continued)

(58) Field of Classification Search
CPC ......... G06F 17/30327; G06F 17/30339; G06F 17/30466; G06F 17/30498;
(Continued)

(56) References Cited

U.S. PATENT DOCUMENTS 5,682,525 A 10/1997 Bouve et al.
5,835,061 A 11/1998 Stewart
(Continued)

FOREIGN PATENT DOCUMENTS

KR 10-2009-0016328 A 2/2009
KR 10-2013-0047808 A 5/2013
(Continued)

OTHER PUBLICATIONS

"U.S. Appl. No. 14/109,797, Non Final Office Action dated May 12, 2017", 14 pgs.
(Continued)

*Primary Examiner* — Dinku W Gebresenbet
(74) *Attorney, Agent, or Firm* — Schwegman Lundberg & Woessner, P.A.

(57) ABSTRACT

In various example embodiments, systems and methods for providing category aspect information by mining historical data is provided. In example embodiments, a table comprising joined data is accessed. The table includes historical data that comprises user behavior data based on actions performed with past queries by users, data describing publication, and a determined category for each publication. Demand scores based on the joined data are determined. The determined demand scores are used to determine most relevant aspect name and aspect value pairs for a category. Publications having at least one of the most relevant aspect name and aspect value pairs are displayed visually distinguished from less relevant publications that exclude the most relevant aspect name and aspect value pairs.

20 Claims, 6 Drawing Sheets

Related U.S. Application Data continuation of application No. 13/492,116, filed on Jun. 8, 2012, now Pat. No. 9,298,776.

(60) Provisional application No. 61/494,583, filed on Jun. 8, 2011.

(51) Int. Cl.

| | | |
|---|---|---|
| *G06F 16/28* | (2019.01) | |
| *G06F 16/22* | (2019.01) | |
| *G06F 16/2455* | (2019.01) | |
| *G06F 16/2457* | (2019.01) | |
| *G06Q 30/02* | (2012.01) | |

(52) U.S. Cl.
CPC .... *G06F 16/2456* (2019.01); *G06F 16/24575* (2019.01); *G06F 16/24578* (2019.01); *G06F 16/285* (2019.01); *G06Q 30/02* (2013.01)

(58) Field of Classification Search
CPC .......... G06F 17/30528; G06F 17/3053; G06F 17/3059; G06F 16/2246; G06F 16/2282; G06F 16/24544; G06F 16/24575; G06F 16/24578; G06F 16/285; G06Q 30/20; G06Q 30/0269; G06Q 50/01; G06Q 10/10; G06Q 30/0617; G06Q 30/0631; G06Q 30/0633; G06Q 50/22; G16H 10/40; G16H 10/60; G16H 40/20
See application file for complete search history.

(56) References Cited

U.S. PATENT DOCUMENTS

| | | | |
|---|---|---|---|
| 5,852,775 | A | 12/1998 | Hidary |
| 6,085,177 | A | 7/2000 | Semple et al. |
| 6,259,405 | B1 | 7/2001 | Stewart et al. |
| 6,326,918 | B1 | 12/2001 | Stewart |
| 6,353,813 | B1 | 3/2002 | Breese et al. |
| 6,385,622 | B2 | 5/2002 | Bouve et al. |
| 6,408,307 | B1 | 6/2002 | Semple et al. |
| 6,415,291 | B2 | 7/2002 | Bouve et al. |
| 6,452,498 | B2 | 9/2002 | Stewart |
| 6,697,018 | B2 | 2/2004 | Stewart |
| 6,759,960 | B2 | 7/2004 | Stewart |
| 6,925,196 | B2 | 8/2005 | Kass et al. |
| 7,009,556 | B2 | 3/2006 | Stewart |
| 7,058,594 | B2 | 6/2006 | Stewart |
| 7,479,949 | B2 | 1/2009 | Jobs et al. |
| 7,840,689 | B2 | 11/2010 | Stewart |
| 7,945,484 | B1 | 5/2011 | Tam et al. |
| 7,996,282 | B1 | 8/2011 | Scott et al. |
| 8,291,350 | B1 | 10/2012 | Park et al. |
| 8,386,406 | B2 | 2/2013 | Bolivar et al. |
| 8,620,909 | B1 | 12/2013 | Rennison |
| 8,639,581 | B1 | 1/2014 | Yalamanchi et al. |
| 8,660,912 | B1 | 2/2014 | Dandekar |
| 8,666,376 | B2 | 3/2014 | Ramer et al. |
| 8,825,519 | B2 | 9/2014 | Sun |
| 9,183,280 | B2 | 11/2015 | Achuthan et al. |
| 9,298,776 | B2 | 3/2016 | Zhong et al. |
| 9,448,718 | B2 | 9/2016 | Howard et al. |
| 9,489,461 | B2 | 11/2016 | Sundaresan |
| 9,519,702 | B2 | 12/2016 | Zhong et al. |
| 9,552,425 | B2 | 1/2017 | Zhong et al. |
| 2001/0001239 | A1 | 5/2001 | Stewart |
| 2001/0005178 | A1 | 6/2001 | Stewart |
| 2001/0021930 | A1 | 9/2001 | Bouve et al. |
| 2001/0043148 | A1 | 11/2001 | Stewart |
| 2001/0054036 | A1 | 12/2001 | Bouve et al. |
| 2002/0002552 | A1 | 1/2002 | Schultz et al. |
| 2002/0032674 | A1 | 3/2002 | Semple et al. |
| 2002/0046090 | A1 | 4/2002 | Stewart |
| 2002/0106111 | A1 | 8/2002 | Kass et al. |
| 2003/0014403 | A1 | 1/2003 | Chandrasekar et al. |
| 2003/0220913 | A1 | 11/2003 | Doganata et al. |
| 2004/0164898 | A1 | 8/2004 | Stewart |
| 2004/0182413 | A1 | 9/2004 | de Laforcade |
| 2004/0186902 | A1 | 9/2004 | Stewart |
| 2004/0260621 | A1 | 12/2004 | Foster et al. |
| 2005/0197946 | A1 | 9/2005 | Williams et al. |
| 2006/0164302 | A1 | 7/2006 | Stewart |
| 2006/0183467 | A1 | 8/2006 | Stewart |
| 2007/0061245 | A1 | 3/2007 | Ramer et al. |
| 2007/0150369 | A1 | 6/2007 | Zivin |
| 2007/0198501 | A1* | 8/2007 | Sundaranatha ... G06F 17/30448 |
| 2007/0208621 | A1 | 9/2007 | Park et al. |
| 2007/0233671 | A1* | 10/2007 | Oztekin ........... G06F 17/30867 |
| 2007/0288433 | A1 | 12/2007 | Gupta et al. |
| 2008/0042899 | A1 | 2/2008 | Stewart |
| 2008/0042900 | A1 | 2/2008 | Stewart |
| 2008/0045241 | A1 | 2/2008 | Stewart |
| 2008/0049696 | A1 | 2/2008 | Stewart |
| 2008/0051108 | A1 | 2/2008 | Stewart |
| 2008/0057924 | A1 | 3/2008 | Stewart |
| 2008/0091443 | A1 | 4/2008 | Strope et al. |
| 2008/0168401 | A1 | 7/2008 | Boule et al. |
| 2008/0215456 | A1 | 9/2008 | West et al. |
| 2008/0248815 | A1 | 10/2008 | Busch |
| 2009/0012955 | A1 | 1/2009 | Chu et al. |
| 2009/0012991 | A1* | 1/2009 | Johnson ................. G06Q 30/02 |
| 2009/0156182 | A1 | 6/2009 | Jenkins et al. |
| 2009/0299887 | A1 | 12/2009 | Shiran et al. |
| 2010/0005069 | A1 | 1/2010 | Wang |
| 2010/0031137 | A1* | 2/2010 | Amaral ............. G06F 17/30893 715/234 |
| 2010/0131367 | A1 | 5/2010 | Sun |
| 2010/0131510 | A1 | 5/2010 | Boone et al. |
| 2010/0235239 | A1 | 9/2010 | Lam et al. |
| 2010/0262454 | A1* | 10/2010 | Sommer ............. G06F 17/3071 706/20 |
| 2010/0283743 | A1 | 11/2010 | Coddington |
| 2010/0318893 | A1* | 12/2010 | Matthews ............. G06F 17/241 715/230 |
| 2011/0055040 | A1 | 3/2011 | Foster et al. |
| 2011/0093361 | A1 | 4/2011 | Morales |
| 2011/0184831 | A1 | 7/2011 | Dalgleish |
| 2011/0191321 | A1 | 8/2011 | Gade et al. |
| 2011/0225155 | A1 | 9/2011 | Roulland et al. |
| 2012/0159294 | A1 | 6/2012 | Gonsalves et al. |
| 2012/0226679 | A1 | 9/2012 | Gollapudi et al. |
| 2012/0253908 | A1 | 10/2012 | Ouimet et al. |
| 2012/0265644 | A1 | 10/2012 | Roa et al. |
| 2012/0310973 | A1 | 12/2012 | Zhong et al. |
| 2012/0317120 | A1 | 12/2012 | Zhong et al. |
| 2013/0085900 | A1 | 4/2013 | Williams |
| 2013/0145319 | A1 | 6/2013 | Wein et al. |
| 2013/0173431 | A1 | 7/2013 | Nations et al. |
| 2013/0246219 | A1 | 9/2013 | Mishanski et al. |
| 2013/0268517 | A1 | 10/2013 | Madhavan et al. |
| 2013/0311335 | A1 | 11/2013 | Howard et al. |
| 2013/0311909 | A1 | 11/2013 | Howard et al. |
| 2014/0019285 | A1 | 1/2014 | Karthik et al. |
| 2014/0279246 | A1 | 9/2014 | Chen et al. |
| 2014/0351049 | A1 | 11/2014 | Sun |
| 2015/0006314 | A1 | 1/2015 | Goulart et al. |
| 2015/0032566 | A1 | 1/2015 | Vardi |
| 2015/0095302 | A1 | 4/2015 | Loftus et al. |
| 2015/0199324 | A1 | 7/2015 | Nishioka |
| 2015/0248481 | A1 | 9/2015 | Sundaresan |
| 2016/0196329 | A1 | 7/2016 | Zhong et al. |
| 2016/0314205 | A1 | 10/2016 | Davis et al. |

FOREIGN PATENT DOCUMENTS

| | | |
|---|---|---|
| WO | 2013/049705 A1 | 4/2013 |
| WO | WO-2016172419 A1 | 10/2016 |

OTHER PUBLICATIONS

"U.S. Appl. No. 14/695,139, Non Final Office Action dated Jun. 22, 2017", 30 pgs.

(56) References Cited

OTHER PUBLICATIONS

"U.S. Appl. No. 13/492,116, Final Office Action dated Jan. 29, 2015", 19 pgs.
"U.S. Appl. No. 13/492,116, Non Final Office Action dated Jun. 3, 2015", 19 pgs.
"U.S. Appl. No. 13/492,116, Non Final Office Action dated Jul. 8, 2014", 15 pgs.
"U.S. Appl. No. 13/492,116, Notice of Allowance dated Dec. 4, 2015", 8 pgs.
"U.S. Appl. No. 13/492,116, Preliminary Amendment filed Jul. 31, 2012", 11 pgs.
"U.S. Appl. No. 13/492,116, Response filed Apr. 28, 2015 to Final Office Action dated Jan. 29, 2015", 11 pgs.
"U.S. Appl. No. 13/492,116, Response filed Sep. 2, 2015 to Non Final Office Action dated Jun. 3, 2015", 12 pgs.
"U.S. Appl. No. 13/492,116, Response filed Oct. 8, 2014 to Non Final Office Action dated Aug. 8, 2014", 12 pgs.
"U.S. Appl. No. 14/109,797, Examiner Interview Summary dated Jun. 30, 2016", 3 pgs.
"U.S. Appl. No. 14/109,797, Examiner Interview Summary dated Oct. 30, 2015", 3 pgs.
"U.S. Appl. No. 14/109 797, Final Office Action dated Apr. 27, 2016", 20 pgs.
"U.S. Appl. No. 14/109,797, Non Final Office Action dated Feb. 11, 2015", 10 pgs.
"U.S. Appl. No. 14/109,797, Non Final Office Action dated Sep. 2, 2015", 12 pgs.
"U.S. Appl. No. 14/109 797, Response filed May 11, 2015 to Non Final Office Action dated Feb. 11, 2015", 27 pgs.
"U.S. Appl. No. 14/109,797, Response filed Jul. 25, 2016 to Final Office Action dated Apr. 27, 2016", 20 pgs.
"U.S. Appl. No. 14/109,797, Response filed Dec. 30, 2015 to Non Final Office Action dated Sep. 2, 2015", 22 pgs.
"U.S. Appl. No. 15/071,309, First Action Interview—Pre-Interview Communication dated Jun. 16, 2016", 4 pgs.
"U.S. Appl. No. 15/071,309, Notice of Allowance dated Aug. 12, 2016", 12 pgs.
"U.S. Appl. No. 15/071,309, Preliminary Amendment filed Mar. 17, 2016", 8 pgs.
"U.S. Appl. No. 15/071,309, Response Filed Jul. 11, 2016 to First Action Interview—Pre-Interview Communication dated Jun. 16, 2016", 3 pgs.
"International Application Serial No. PCT/US2016/028753, International Search Report dated Jul. 15, 2016", 5 pgs.
"International Application Serial No. PCT/US2016/028753, Written Opinion dated Jul. 15, 2016", 8 pgs.
"U.S. Appl. No. 14/109,797, Response filed Aug. 14, 2017 to Non Final Office Action dated May 12, 2017", 21 pgs.
"U.S. Appl. No. 14/695,139, Response filed Sep. 22, 2017 to Non Final Office Action dated Jun. 22, 2017", 15 pgs.
Final Office Action received for Korean Patent Application No. 10-2017-7033817, dated Jan. 24, 2019, 3 pages. (Official Copy Only).
Preliminary Rejection received for Korean Patent Application No. 10-2017-7033817, dated Jul. 20, 2018, 11 pages. (4 pages of English Translation and 7 pages of Official Copy).
Response to Preliminary Rejection filed on Sep. 14, 2018, for Korean Patent Application No. 10-2017-7033817, dated Jul. 20, 2018, 31 pages. (22 pages of Official Copy and 9 pages of English Translation of Claims).
Advisory Action received for U.S. Appl. No. 14/109,797, dated Mar. 2, 2018, 3 pages.
Applicant Initiated Interview Summary Received for U.S. Appl. No. 14/109,797 dated Apr. 5, 2018, 2 pages.
Final Office Action received for U.S. Appl. No. 14/109,797, dated Jan. 17, 2019, 13 pages.
Final Office Action received for U.S. Appl. No. 14/109,797, dated Nov. 17, 2017, 10 pages.

Non-Final Office Action Received for U.S. Appl. No. 14/109,797 dated Apr. 5, 2018, 7 pages.
Response to Final Office Action and Advisory Action filed on Mar. 15, 2018, for U.S. Appl. No. 14/109,797, dated Nov. 17, 2017 and Mar. 2, 2018, 19 pages.
Response to Final Office Action filed on Jan. 19, 2018, for U.S. Appl. No. 14/109,797, dated Nov. 17, 2017, 19 Pages.
Response to Non-Final Office Action filed on Sep. 10, 2018, for U.S. Appl. No. 14/109,797, dated May 10, 2018, 23 pages.
Applicant Initiated Interview Summary Received for U.S. Appl. No. 14/695,139 dated Oct. 12, 2017, 3 pages.
Applicant Initiated Interview Summary Received for U.S. Appl. No. 14/695,139 dated Sep. 17, 2018, 3 pages.
Final Office Action received for U.S. Appl. No. 14/695,139, dated Jan. 8, 2019, 24 pages.
Final Office Action received for U.S. Appl. No. 14/695,139, dated Dec. 21, 2017, 27 Pages.
Non-Final Office Action received for U.S. Appl. No. 14/695,139, dated Jun. 22, 2018, 26 pages.
Response to Final Office Action filed on Mar. 20, 2018, for U.S. Appl. No. 14/695,139, dated Dec. 21, 2017, 19 pages.
Response to Non-Final Office Action filed on Sep. 21, 2018, for U.S. Appl. No. 14/695,139 dated Jun. 22, 2018, 18 pages.
First Examination Report Received for Australian Patent Application No. 2016250656, dated May 16, 2018, 4 pages.
Notice of Acceptance received for Australian Patent Application No. 2016250656, dated Oct. 24, 2018, 3 pages.
Response to First Examiner Report filed on Aug. 10, 2018, for Australian Patent Application No. 2016250656, dated May 16, 2018, 24 pages.
Response to Second Examination Report flied on Oct. 9, 2018, for Australian Patent Application No. 2016250656, dated Aug. 14, 2018, 3 pages.
Second Examination Report received for Australian Patent Application No. 2016250656, dated Aug. 14, 2018, 3 pages.
Apple, "Apple_MouseOver", Nov. 13, 2010, 1 page.
Business Wire, "Amazon's Collection of Mobile shopping Apps Now Includes the Amazon App for Windows Phone 7", Retrieved from the Internet URL:<http://m.hexus.net/mobile/items/windows-phone/28997-amazons-collection-mobile-shopping-apps-now-includes-amazon-app-windows-phone-7/>, Feb. 10, 2011, 2 pages.
International Preliminary Report on Patentability received for PCT Application No. PCT/US2016/028753, dated Nov. 2, 2017, 8 pages.
Advisory Action received for U.S. Appl. No. 14/695,139, dated Mar. 29, 2019, 3 pages.
Final Office Action received for Korean Patent Application No. 10-2017-7033817, dated Apr. 22, 2019, 4 pages (2 pages Official copy and 2 pages English translation).
Non-Final Office Action Received for U.S. Appl. No. 14/109,797 dated May 10, 2018, 8 pages.
Notice of Allowance received for U.S. Appl. No. 14/109,797, dated Mar. 22, 2019, 14 pages.
Response to Office Action filed on Mar. 26, 2019, for Korean Patent Application No. 10-2017-7033817, dated Jan. 24, 2019, 23 pages(8 pages of English Translation and 15 pages of Official Copy).
Response to Final Office Action filed on Mar. 5, 2019, for U.S. Appl. No. 14/109,797, dated Jan. 17, 2019, 20 pages.
Response to Final Office Action filed on Mar. 6, 2019, for U.S. Appl. No. 14/695,139, dated Jan. 8, 2019, 10 pages.
Samiee, "The Internet and International Marketing: Is There a Fit?", Journal of Interactive Marketing, vol. 12, No. 4, 1998, 17 pages.
Non-Final Office Action received for U.S. Appl. No. 14/695,139, dated Jul. 3, 2019, 25 pages.
Notice of Allowance received for U.S. Appl. No. 14/109,797, dated Aug. 20, 2019, 9 pages.
Preliminary Amendment received for U.S. Appl. No. 16/450,689, filed Jun. 24, 2019, 3 pages.

* cited by examiner

SYSTEM AND METHOD FOR MINING CATEGORY ASPECT INFORMATION

CROSS REFERENCE TO RELATED APPLICATION

This application is a continuation of and claims the benefit of priority to U.S. patent application Ser. No. 15/071,309, filed on Mar. 16, 2016, which is a continuation of and claims the benefit of priority to U.S. patent application Ser. No. 13/492,116, filed on Jun. 8, 2012, now U.S. Pat. No. 9,298,776, which claims the benefit of priority to U.S. Provisional Patent Application Ser. No. 61/494,583 filed on Jun. 8, 2011 the benefit of priority of each of which is claimed hereby, and each of which are incorporated by reference herein in its entirety.

FIELD

The present disclosure relates generally to query aspects, and in a specific example embodiment, to mining category aspect information to determine most relevant category aspect information for a category.

BACKGROUND

In conventional information retrieval systems, an author may provide certain descriptions in their publication. However, the author may not be aware of the descriptions or other category aspect information that may be most relevant to other users when these users search for publications.

BRIEF DESCRIPTION OF DRAWINGS

Various ones of the appended drawings merely illustrate example embodiments of the present invention and cannot be considered as limiting its scope.

DETAILED DESCRIPTION

The description that follows includes systems, methods, techniques, instruction sequences, and computing machine program products that embody illustrative embodiments of the present invention. In the following description, for purposes of explanation, numerous specific details are set forth in order to provide an understanding of various embodiments of the inventive subject matter. It will be evident, however, to those skilled in the art that embodiments of the inventive subject matter may be practiced without these specific details. In general, well-known instruction instances, protocols, structures, and techniques have not been shown in detail.

In example embodiments, systems and methods for providing category aspect information by mining historical data is provided. In example embodiments, historical data is compiled. The historical data comprises user behavior data based on actions performed by users. Listing data is accessed. The listing data includes aspect data for each listing. The historical data is then joined with the listing data and a determined category (of a category tree structure) of the listing to create joined data. Demand scores based on the joined data are determined. The determined demand scores is then sorted to determine at least one relevant aspect name for a category.

A category aspect may comprise an aspect name for a category. For example, a category of smartphones may have an aspect name "brand." The aspect names have corresponding aspect values that may be ranked in priority. Continuing with the example, the aspect name "brand" may have an aspect value "Apple iPhone." Another aspect name may be "condition" and the corresponding aspect value may be "new" or "used." Based on the determination of the most relevant category aspects, guidance may be provided to publishers to include the most relevant category aspect, and publications containing the most relevant category aspect may be promoted when presenting results of a search or navigation.

Figure 1:
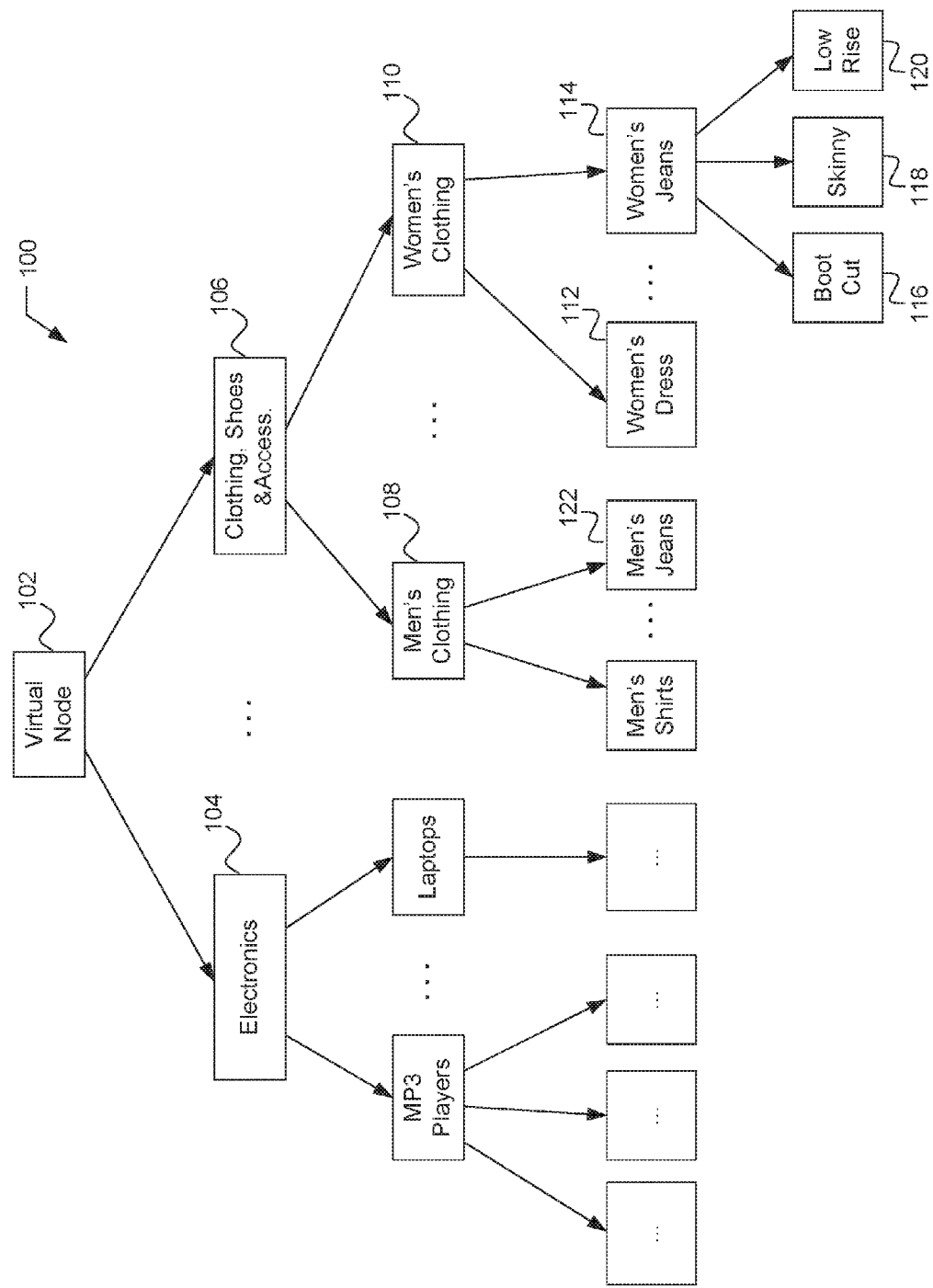
FIG. 1 is a diagram of an example category tree used in accordance with example embodiments.

FIG. 1 illustrates an example of a category tree structure 100. In the present example, the category tree structure 100 is applied to a marketplace environment in which items in various categories may be offered for sale. It is noted that this is merely an example, and other embodiments may contemplate the use of the category tree structure 100 and example embodiments described herein in non-marketplace environments such as an informational environment. Additionally, the categories within the category tree structure are merely provided as an example and may comprise any type of category.

As shown, the category tree structure 100 starts with a virtual node 102 and branches into various categories (also referred to as leaf categories). In the example, two $2^{nd}$ level categories are shown as an electronics category 104 and clothing, shoes, and accessories (CSA) category 106. In a next lower level (i.e., $3^{rd}$ level), each of the $2^{nd}$ level categories is further divided into more narrowing categories. For example, the CSA category 106 is split into at least a men's clothing category 108 and a women's clothing category 110. Further still, the women's clothing category 110 may include at least a women's dress category 112 and a women's jeans category 114 in a next lower level. It is noted that further categories may exist at each category level and further lower category levels may exist, but have not been shown in FIG. 1.

When a user (e.g., seller on a networked marketplace) lists an item using the category tree structure 100, the user may be restricted to listing the item within a lower level category. For example, a seller may be listing a pair of women's jeans for sale. The seller may be restricted to listing the jeans within a women's jeans category 114. In an even more restrictive embodiment, the seller may be restricted to listing the jeans within a boot-cut category 116, a skinny category 118, or a low rise category 120. In some embodiments, the seller may not be allowed to list the jeans in a higher category such as the women's clothing category 110. By restricting the user to listing their item in a more specific category, more specific category information may be tracked by embodiments of the present invention.

Additionally, the most relevant category aspects (e.g., aspect name or aspect values) for each category may be determined from logged user behavior data. The category aspects comprise attributes or characteristics of an item which in some embodiments may be in the form of metadata. For example, the women's jeans category may comprise relevant category aspects of brands, sizes, and styles.

Each category of the category tree structure 100 may have a different set of relevant category aspects. For example, the CSA (clothes, shoes, and accessories) category 106 may have relevant aspects directed to conditions, prices, sellers, and buying formats. The women's clothing category 110 may have relevant aspects directed to women's brands, women's clothing sizes, colors, and aspects inherited from the CSA category 106. Moving further down in levels, the women's jeans category 114 may comprise relevant aspects of women's popular jeans brands, jeans bottom sizes, jeans styles, jeans inseams, and aspects inherited from the CSA category 106 and the women's clothing category 110. Within the jean style category, aspects of boot-cut, skinny, low-rise, and others may be identified. Within the skinny (jeans) category, relevant aspects may comprise women's popular skinny jeans brands, women's skinny jeans materials, and aspects inherited from higher level categories. As such, each category at each level may comprise different relevant category aspects (e.g., aspect names or aspect values).

Additionally, categories within the same level may comprise different relevant aspects and corresponding values. For example, within the women's jeans category 114, the relevant aspects (e.g., aspect name) in descending order of relevancy based on past user behavior may be size, brand, style, and inseam. Furthermore, the relevant aspect values for the brand in descending order of relevancy may be 7 For All Mankind, True Religion, American Eagle, Abercrombie & Fitch, and Levis, while relevant values for style in descending order of relevancy may be boot cut, slim/skinny, low-rise/hipster, and stretch. In contrast, a men's jeans category may comprise relevant aspect name in descending order of relevancy of waist size, brand, inseam, and style. The relevant aspect values for the brand in the men's jeans category 122 in descending order of relevancy may be Levis, Diesel, 7 For All Mankind, Ralph Lauren, and Calvin Klein, while relevant aspect values for style in descending order of relevancy may be boot cut, straight leg, relaxed, and classic.

In example embodiments, user behavior data is collected. The user behavior data comprises tracked user actions associated with past queries involving a query term. The user behavior data is compiled and listing data is accessed. The listing data includes aspect data for each listing. The user behavior data is joined with the listing data and a determined category of each listing to create joined data. Demand scores are determined based on the joined data. The determined demand scores are then sorted to determine at least one relevant aspect name for a category. Additionally, the determined demand scores may be sorted to determine at least one relevant aspect value for the at least one relevant aspect name.

By using embodiments of the present invention, a publisher (e.g., seller) may be notified of one or more relevant aspect names to include when creating their publication (e.g., listing for an item to sell). As a result, a user performing a search can be provided results that are more specific to their search. Accordingly, one or more of the methodologies discussed herein may obviate a need for additional searching or navigation by the user, which may have the technical effect of reducing computing resources used by one or more devices within the system. Examples of such computing resources include, without limitation, processor cycles, network traffic, memory usage, storage space, and power consumption.

Figure 2:
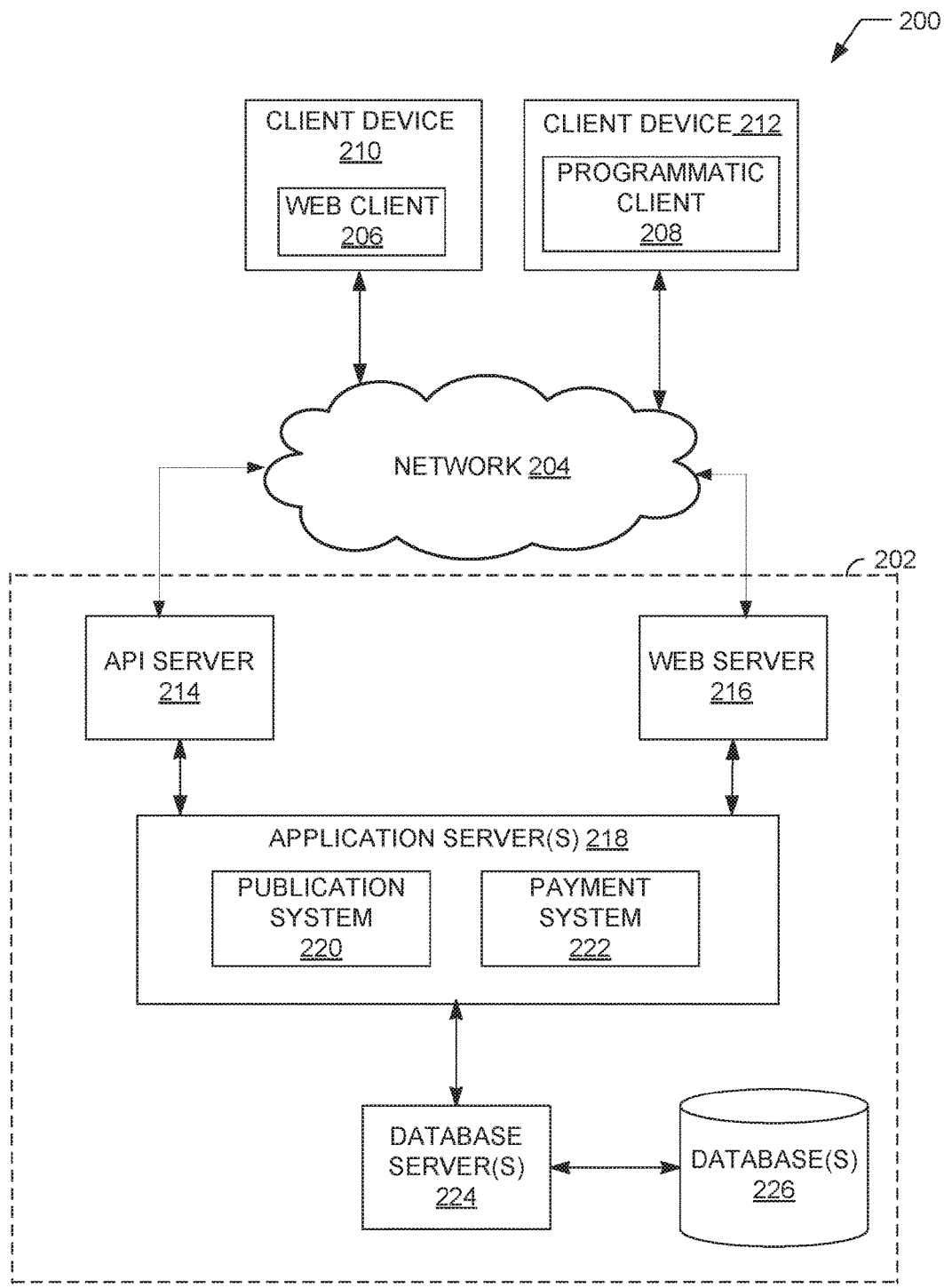
FIG. 2 is a block diagram illustrating an example embodiment of a network architecture of a system used in determining query aspects.

With reference to FIG. 2, an example embodiment of a high-level client-server-based network architecture 200 for mining category aspect information is shown. A networked system 202, in an example form of a network-server-side functionality, is coupled via a communication network 204 (e.g., the Internet, wireless network, cellular network, or a Wide Area Network (WAN)) to one or more client devices 210 and 212. FIG. 2 illustrates, for example, a web client 206 operating via a browser (e.g., such as the INTERNET EXPLORER® browser developed by Microsoft Corporation of Redmond, Wash. State), and a programmatic client 208 executing on respective client devices 210 and 212.

The client devices 210 and 212 may comprise a mobile phone, desktop computer, laptop, or any other communication device that a user may utilize to access the networked system 202. In some embodiments, the client device 210 may comprise or be connectable to an image capture device (e.g., camera). The client device 210 may also comprise a voice recognition module (not shown) to receive audio input and a display module (not shown) to display information (e.g., in the form of user interfaces). In further embodiments, the client device 210 may comprise one or more of a touch screen, accelerometer, and GPS device. The client devices 210 and 212 may each be a device of an individual user or business authoring, or searching for, listings or publications on the networked system 202. In one embodiment, the networked system 202 is a network-based marketplace and the listings comprise item listings of items for sale on the network-based marketplace.

An Application Program Interface (API) server 214 and a web server 216 are coupled to, and provide programmatic and web interfaces respectively to, one or more application servers 218. The application servers 218 host a publication system 220 and a payment system 222, each of which may comprise one or more modules, applications, or engines, and each of which may be embodied as hardware, software, firmware, or any combination thereof. The application servers 218 are, in turn, coupled to one or more database servers 224 facilitating access to one or more information storage repositories or database(s) 226. In one embodiment, the databases 226 are storage devices that store information to be posted to the publication system 220. The databases 226 may also store a user behavior data and category aspects information determined for the networked system 202 in accordance with example embodiments.

The publication system 220 publishes content on a network (e.g., Internet). As such, the publication system 220 provides a number of publication and marketplace functions and services to users that access the networked system 202. The publication system 220 is discussed in more detail in connection with FIG. 3. In example embodiments, the publication system 220 is discussed in terms of a marketplace environment. However, it is noted that the publication system 220 may be associated with a non-marketplace environment such as an informational environment.

The payment system 222 provides a number of payment services and functions to users. The payment system 222 allows users to accumulate value (e.g., in a commercial currency, such as the U.S. dollar, or a proprietary currency, such as "points") in accounts, and then later to redeem the accumulated value for products (e.g., goods or services) that are made available via the publication system 220. The payment system 222 also facilitates payments from a payment mechanism (e.g., a bank account, PayPal™, or credit card) for purchases of items via a network-based marketplace. While the publication system 220 and the payment system 222 are shown in FIG. 2 to both form part of the networked system 202, it will be appreciated that, in alternative embodiments, the payment system 222 may form part of a payment service that is separate and distinct from the networked system 202.

While the example network architecture 200 of FIG. 2 employs a client-server architecture, a skilled artisan will recognize that the present disclosure is not limited to such an architecture. The example network architecture 200 can equally well find application in, for example, a distributed or peer-to-peer architecture system. The publication system 220 and payment system 222 may also be implemented as standalone systems or standalone software programs operating under separate hardware platforms, which do not necessarily have networking capabilities.

Figure 3:
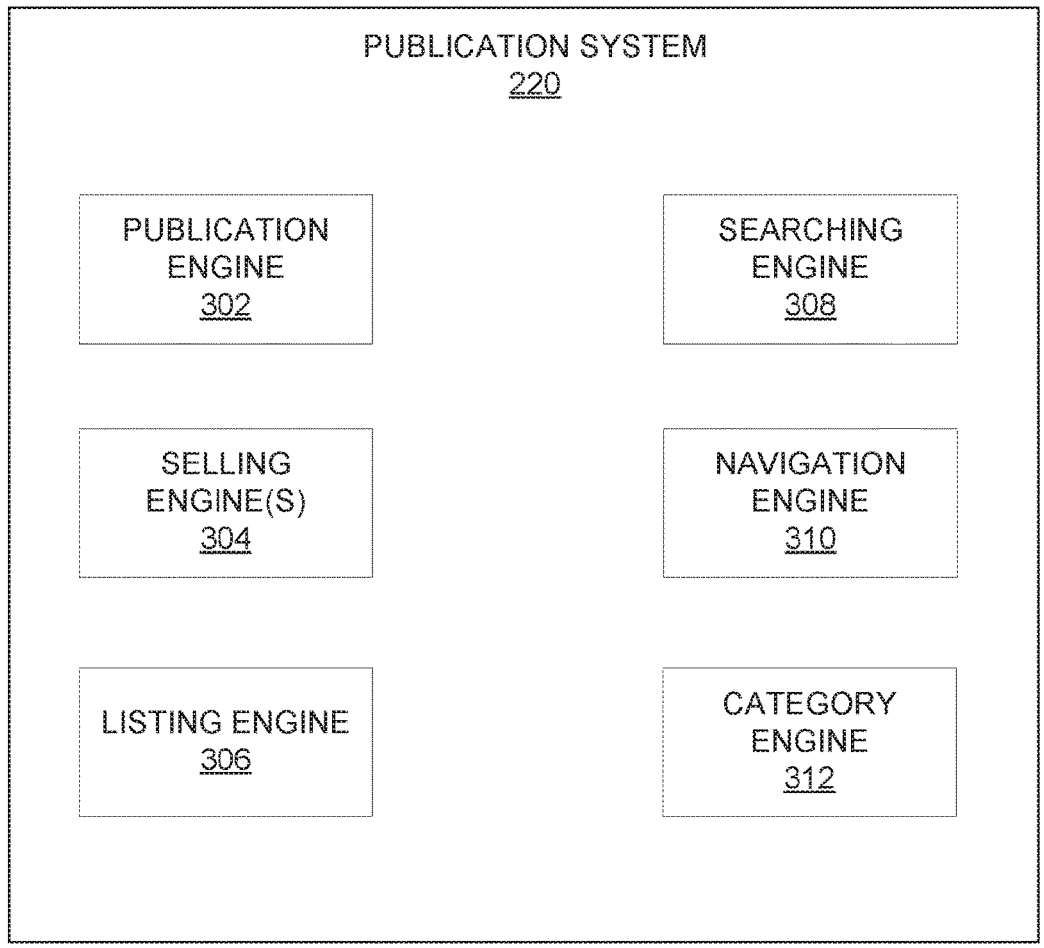
FIG. 3 is a block diagram illustrating an example embodiment of a publication system.

Referring now to FIG. 3, an example block diagram illustrating multiple components that, in one example embodiment, are provided within the publication system 220 of the networked system 202 is shown. The publication system 220 may be hosted on dedicated or shared server machines (not shown) that are communicatively coupled to enable communications between the server machines. The multiple components, themselves, are communicatively coupled (e.g., via appropriate interfaces), either directly or indirectly, to each other and to various data sources, to allow information to be passed between the components or to allow the components to share and access common data. Furthermore, the components may access the one or more database(s) 226 via the one or more database servers 224, both shown in FIG. 2.

In one embodiment, the publication system 220 comprises a network-based marketplace and provides a number of publishing, listing, and price-setting mechanisms whereby a seller (e.g., business or consumer) may list (or publish information concerning) goods or services for sale, a buyer can search for, express interest in, or indicate a desire to purchase such goods or services, and a price can be set for a transaction pertaining to the goods or services. To this end, the publication system 220 may comprise at least one publication engine 302 and one or more selling engines 304. The publication engine 302 may publish information, such as item listings, on the publication system 220. In some embodiments, the selling engines 304 may comprise one or more auction engines that support auction-format listing and price setting mechanisms (e.g., English, Dutch, Chinese, Double, Reverse auctions, etc.). The various auction engines may also provide a number of features in support of these auction-format listings, such as a reserve price feature whereby a seller may specify a reserve price in connection with a listing and a proxy-bidding feature whereby a bidder may invoke automated proxy bidding.

A listing engine 306 allows sellers to conveniently author listings of items or authors to author publications. In one embodiment, the listings pertain to goods or services that a user (e.g., a seller) wishes to transact via the publication system 220. Each good or service is associated with a particular category. The listing engine 306 may receive listing data such as title, description, and aspect name/value pairs. Furthermore, each listing for a good or service may be assigned an item identifier. In other embodiments, a user may create a listing that is an advertisement or other form of information publication. The listing information may then be stored to one or more storage devices coupled to the publication system 220 (e.g., databases 226).

Searching the network-based publication system 220 is facilitated by a searching engine 308. For example, the searching engine 308 enables keyword queries of listings published via the publication system 220. In example embodiments, the searching engine 308 receives the keyword queries from a device of a user and conducts a review of the storage device storing the listing information. The review will enable compilation of a result set of listings that may be sorted and returned to the client device (e.g., client device 210) of the user. The searching engine 308 may record the query (e.g., keywords) and any subsequent user actions and behaviors (e.g., navigations).

In a further example, a navigation engine 310 allows users to navigate through various categories, catalogs, or inventory data structures according to which listings may be classified within the publication system 220. For example, the navigation engine 310 allows a user to successively navigate down a category tree comprising a hierarchy of categories (e.g., the category tree structure 100) until a particular set of listing is reached. Various other navigation applications within the navigation engine 310 may be provided to supplement the searching and browsing applications. The navigation engine 310 may record the various user actions (e.g., clicks) performed by the user in order to navigate down the category tree.

A category engine 312 manages mining for category aspect information. In example embodiments, the category engine 312 uses tracked information from the searching engine 308 and the navigation engine 310 as well of seller listing information to determine the most relevant category aspects (e.g., aspect name/value pairs) each category. The category engine 312 will be discussed in more detail in connection with FIG. 4 below.

Although the various components of the publication system 220 have been discussed in terms of a variety of individual modules and engines, a skilled artisan will recognize that many of the items can be combined or organized in other ways. Furthermore, not all components of the publication system 220 have been included in FIG. 3. In general, components, protocols, structures, and techniques not directly related to functions of example embodiments (e.g., dispute resolution engine, loyalty promotion engine, reputation engines, listing management engines, account engine) have not been shown or discussed in detail. The description given herein simply provides a variety of example embodiments to aid the reader in an understanding of the systems and methods used herein.

Figure 4:
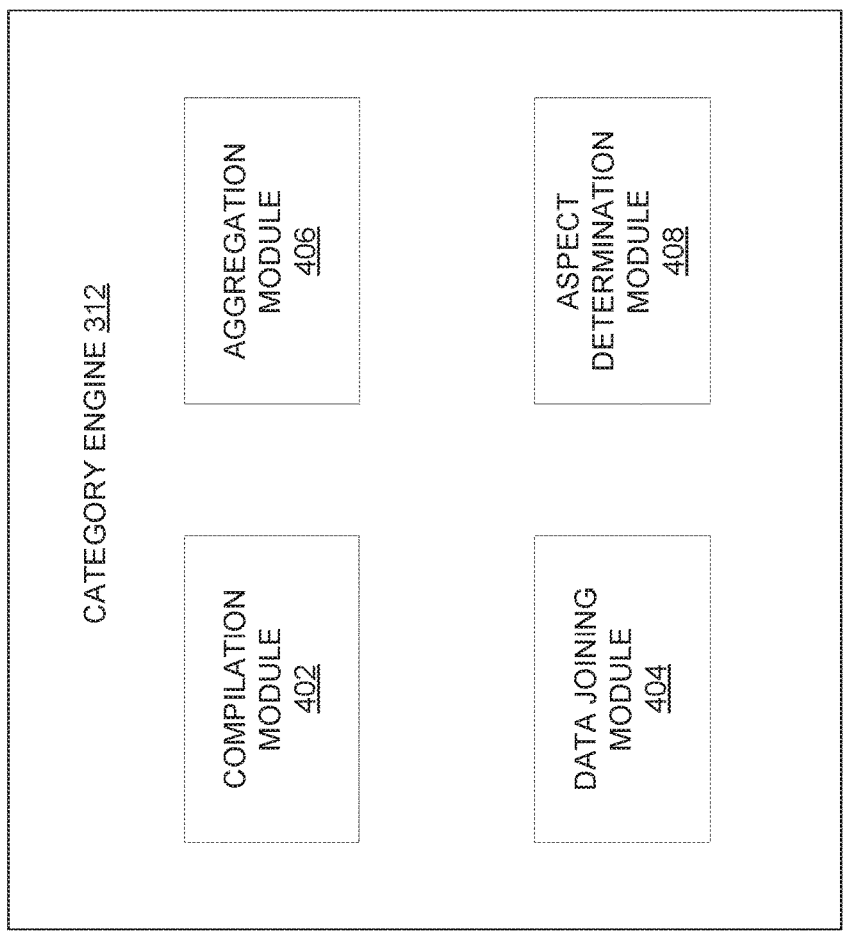
FIG. 4 is a block diagram illustrating an example embodiment of a category engine.

FIG. 4 is a block diagram illustrating an example embodiment of the category engine 312. The category engine 312 comprises components that are communicatively coupled (e.g., via appropriate interfaces), either directly or indirectly, to each other and to various data sources, to allow information to be passed between the components or to allow the components to share and access common data. The category engine 312 determines aspects information (e.g., most relevant aspect name/value pairs) for each category by mining historical data sets of logged (tracked) user action/behavior on a site (e.g., a site provided by the publication system 220). The historical data sets may comprise recorded actions by users of the site such as search queries (e.g., input keywords), specified categories and aspects, and click-through actions used to narrow a search down to a particular set of items, publications, or listings.

In example embodiments, a compilation module 402 compiles the historical data set recorded by and received from the searching engine 308 or the navigation engine 310. For example, when a query is received by the searching engine 308, all the item listings shown on a search result page are recorded by the searching engine 308 or the compilation module 402. Each item listing corresponds to at least one item and is identifiable with an item identifier. The historical data set may comprise a number of impressions for each item or query (e.g., a number of times the item is shown to the user). Other user actions and behavior may be included in the historical data set such as, for example, clicks (e.g., selection of an item listing for viewing), Buy-It-Now (BIN) actions (developed by eBay Inc., of San Jose, Calif.), bid actions (e.g., placing a bid on an item of the item listing), watch actions (e.g., placing the item listing into a watch list to monitor the item listing), ask actions (e.g., asking a question on the item listing), and offer actions making a best offer on an item listing).

The historical data set used by the category engine 312 may comprise data for a particular period of time. In one embodiment, the historical data set comprises data for the past 100 days. Alternative embodiment may utilize any length or period of time for data analysis by the category engine 312. Because the historical data set used by the category engine 312 may be continually updated with more recent logged data, the category engine 312 is able to capture current trends. For example, the category engine 312 may process the historical data set (of the last 100 days) on a weekly basis to update or revise the most relevant aspect names and aspect values for each category.

The compilation module 402 also accesses and obtains item listing data. When the user (e.g., seller) authors the item listing, the user may provide information such as a category (e.g., a left category from a category tree), title, description, aspects (e.g., brand name, size, color, condition, style) in order to classify and describe the item in the item listing.

A data joining module 404 processes the compiled data by joining the user behavior data from the historical data set with corresponding seller provided item data (e.g., aspect data) and the chosen leaf category from a category tree structure (e.g., the category tree structure 100) for each item. Therefore for each item, the data joining module 404 may create a large table from the three sets of data. The table may include, for example, the query (e.g., keywords), item identifier, leaf category, aspect name(s), aspect value(s), and total number of impressions, clicks, BINs, bids, watch actions, ask actions, and offers for each item.

The aggregation module 406 aggregates over the joined data to define a demand score. In the present example, the demand score is a function of action counts based on the impression counts, click action counts, BIN action counts, bid action counts, watch action counts, ask action counts, and offer action counts. In example embodiments, the aggregation module 406 aggregates a count in every leaf category level for every aspect name/value pair. Thus, the demand score for the same [category, aspect name] are summed up by the aggregation module 406. For example, the demand score may be calculated for [women's jeans, brands] and [women's jeans, sizes] to determine one or more most relevant aspect names for the category of women's jeans. Additionally, the demand score for the same [category, aspect name, aspect value] may be summed up to determine relevant aspect values for particular aspect names. For example, the demand scores for [women's jeans, brand, 7 For All Mankind], [women's jeans, brand, True Religion], and so forth for major brands may be summed up to determine one or more most relevant aspect values for the brand aspect name.

Thus, the demand score (from a query to an aspect value) is a function of the impression counts, click actions, BIN actions, bid actions, watch actions, ask actions, and offer actions in accordance with one embodiment. For instance, the demand score can be defined as a number of clicks an item with that specific aspect value got from a specific query. So the demand score can be understood as (query, item_leaf_category, aspect name, aspect value) level data. When identifying the most important aspects in a leaf category, the query and aspect value information may be ignored by summing up demand scores from the same (item_leaf_category, and aspect name).

An aspect determination module 408 determines relevant aspect information based on the aspect demand scores. For the same category, the aspect names are sorted according to their demand score in descending order to identify the most relevant aspect names for the category (e.g., demand scores are sorted for the [category, aspect name]). For example, for the women's jeans category, the most relevant aspect name may be brand, followed by inseam and size.

It is noted that for different categories, different aspect names may be determined to be relevant. For example, for a cell phone and PDA accessory category, the most relevant aspect names in descending order may be brand, carrier, style, compatible product, camera, memory, and contract. In contrast, the women's jeans category may have most relevant aspect names in descending order of brand, inseam, size, rise, material, leg opening, color, and wash.

The aspect determination module 408 then determines the most relevant aspect values for the most relevant aspect names in each category. Using the summed up demand score for the same [category, aspect name, aspect value], the aspect values are sorted. Thus, for the same [category, aspect name], the aspect values are sorted according to their demand score in descending order to identify the most important aspect values. For a [category, aspect name] that is [women's jean, brand], the most relevant/important aspect value is, for example, 7 for All Mankind, followed by True Religion and American Eagle in descending order. In example embodiments, only a top number of aspect name and value pairs are associated with the search query. It is noted that in some embodiments, the functions of the aggregation module 406 and the aspect determination module 408 may be combined within a single module (e.g., the aspect determination module 408).

Figure 5:
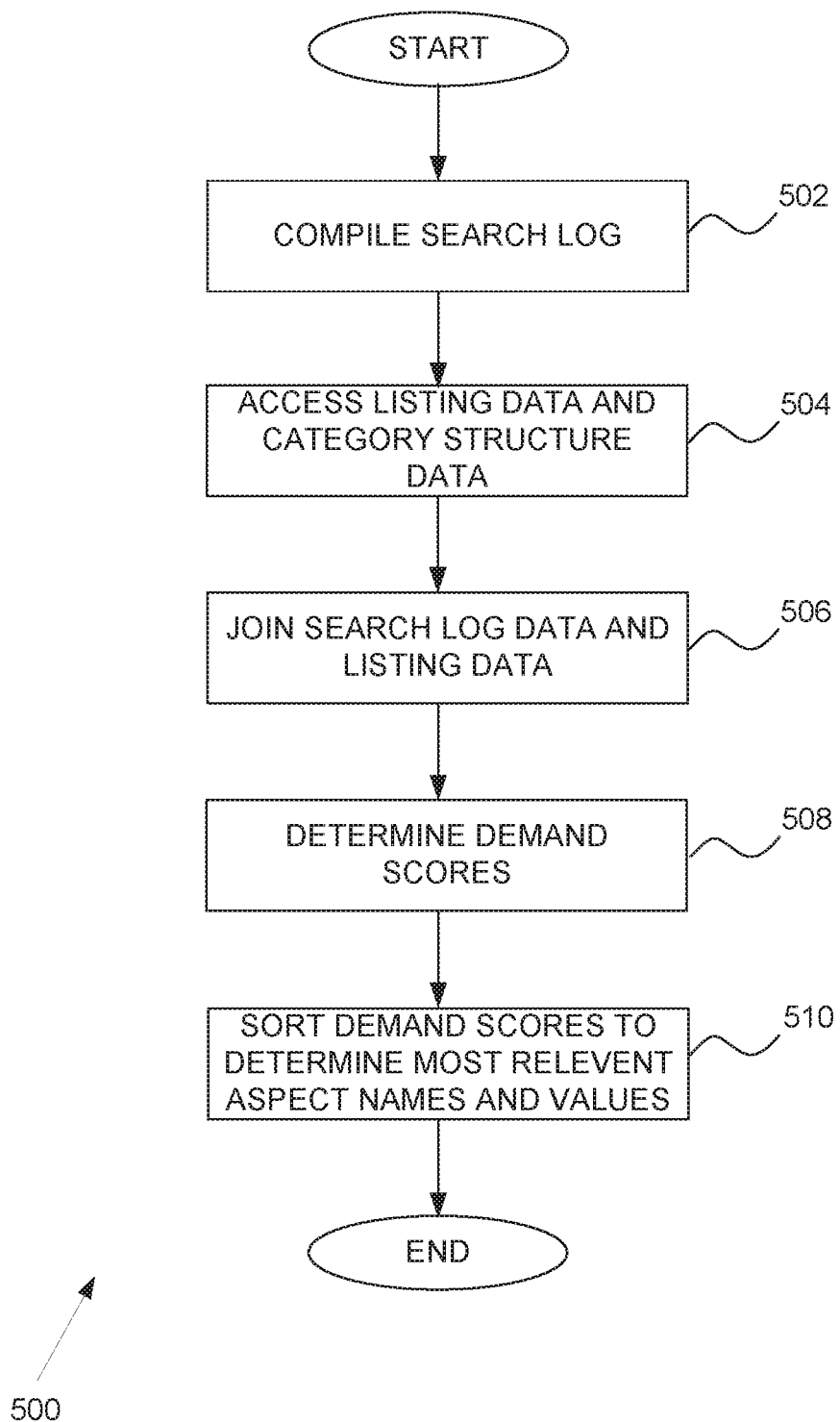
FIG. 5 is a flow diagram of an example high-level method for mining category aspect information.

FIG. 5 is a flow diagram of an example high-level method 500 for mining category aspect information. In operation 502, the compilation module 402 compiles the search logs of historical data sets recorded by and received from the searching engine 208 or the navigation engine 210. The historical data set includes data collected from user actions and behaviors with past search queries.

In operation 504, the compilation module 402 accesses the listing data and, in some embodiments, the category structure data. The listing data comprises information received from an author of the listing or publication that describes the item of the listing. The category structure data provides data related to the category tree structure.

In operation 506, the log data, listing data, and category data may be joined by the data joining module 404. Specifically, the data joining module 404 joins the user behavior data from the historical data set with corresponding seller provided item data (e.g., aspect data) and the chosen leaf category from the category tree structure for each item.

In operation 508, demand scores are determined by the aggregation module 406. For example, the demand score is a function of the impression counts, click actions, BIN actions, bid actions, watch actions, ask actions, and offer actions. The demand score for the same [category, aspect name] are summed up by the aggregation module 406. Additionally, the demand score for the same [category, aspect name, aspect value] may be summed up.

In operation 510, the demand scores are sorted to determine the most relevant aspect names and aspect values by the aspect determination module 408. For the same category, the aspect names are sorted according to their demand score in descending order to identify the most relevant aspect names for the category. Similarly for the same [category, aspect name], the aspect values are sorted according to their demand score in descending order to identify the most important aspect values.

By determining the most relevant aspect names for each category and the most relevant aspect values for the most relevant aspect names, listing quality and search results may be improved. For example, when the most important aspect names are identified for a particular category, the seller may be notified according. Thus, for example, assume the most relevant aspects (e.g., aspect names) for a women's jean category is brand and size. When a seller attempts to list an item in the women's jean category, the seller may be shown a message indicating that the seller may want to consider listing brand and size information since these are two most important aspects buyers are interested in. In one embodiment, the listing engine 306 may provide the message to the seller as the seller is creating the listing.

In a further embodiment, results may be used to promote some listings over other listings. Once the most important aspect name/values in a category are determined, a ranking function can be applied that promotes or boosts item listings that contain the most relevant or important aspect name/value pairs in the category. Accordingly, a top number of aspect names and aspect value pairs may be selected to be promoted. The promoted item listing may be listed first, be listed more prominently (e.g., with bold or highlights), or any other means to visually distinguish the listing from less relevant listings. For example, the ranking function may rank listing for jeans with size and brand information specified higher than listings without this information. Additionally, suppose 7 for All Mankind is a more popular (e.g., relevant) brand than Old Navy in the women's jeans category. Item listings for jeans that are 7 for All Mankind may be ranked higher than item listings for jeans for Old Navy and promoted in a result set. This may be particularly useful when a user did not specify a query or a detailed query, but is simply browsing items in a category. In example embodiments, the aspect determination module 408 determines the listings to be promoted and notifies the publication engine 302.

Modules, Components, and Logic

Additionally, certain embodiments described herein may be implemented as logic or a number of modules, engines, components, or mechanisms. A module, engine, logic, component, or mechanism (collectively referred to as a "module") may be a tangible unit capable of performing certain operations and configured or arranged in a certain manner (e.g., hardware). In certain example embodiments, one or more computer systems (e.g., a standalone, client, or server computer system) or one or more components of a computer system (e.g., a processor or a group of processors) may be configured by software (e.g., an application or application portion) or firmware (note that software and firmware can generally be used interchangeably herein as is known by a skilled artisan) as a module that operates to perform certain operations described herein.

In various embodiments, a module may be implemented mechanically or electronically. For example, a module may comprise dedicated circuitry or logic that is permanently configured (e.g., within a special-purpose processor, application specific integrated circuit (ASIC), or array) to perform certain operations. A module may also comprise programmable logic or circuitry (e.g., as encompassed within a general-purpose processor or other programmable processor) that is temporarily configured by software or firmware to perform certain operations. It will be appreciated that a decision to implement a module mechanically, in dedicated and permanently configured circuitry, or in temporarily configured circuitry (e.g., configured by software) may be driven by, for example, cost, time, energy-usage, and package size considerations.

Accordingly, the term "module" should be understood to encompass a tangible entity, be that an entity that is physically construed, permanently configured (e.g., hardwired), or temporarily configured (e.g., programmed) to operate in a certain manner or to perform certain operations described herein. Considering embodiments in which modules or components are temporarily configured (e.g., programmed), each of the modules or components need not be configured or instantiated at any one instance in time. For example, where the modules or components comprise a general-purpose processor configured using software, the general-purpose processor may be configured as respective different modules at different times. Software may accordingly configure the processor to constitute a particular module at one instance of time and to constitute a different module at a different instance of time.

Modules can provide information to, and receive information from, other modules. Accordingly, the described modules may be regarded as being communicatively coupled. Where multiples of such modules exist contemporaneously, communications may be achieved through signal transmission (e.g., over appropriate circuits and buses) that connect the modules. In embodiments in which multiple modules are configured or instantiated at different times, communications between such modules may be achieved, for example, through the storage and retrieval of information in memory structures to which the multiple modules have access. For example, one module may perform an operation and store the output of that operation in a memory device to which it is communicatively coupled. A further module may then, at a later time, access the memory device to retrieve and process the stored output. Modules may also initiate communications with input or output devices and can operate on a resource (e.g., a collection of information).

Example Machine Architecture and Machine-Readable Medium

Figure 6:
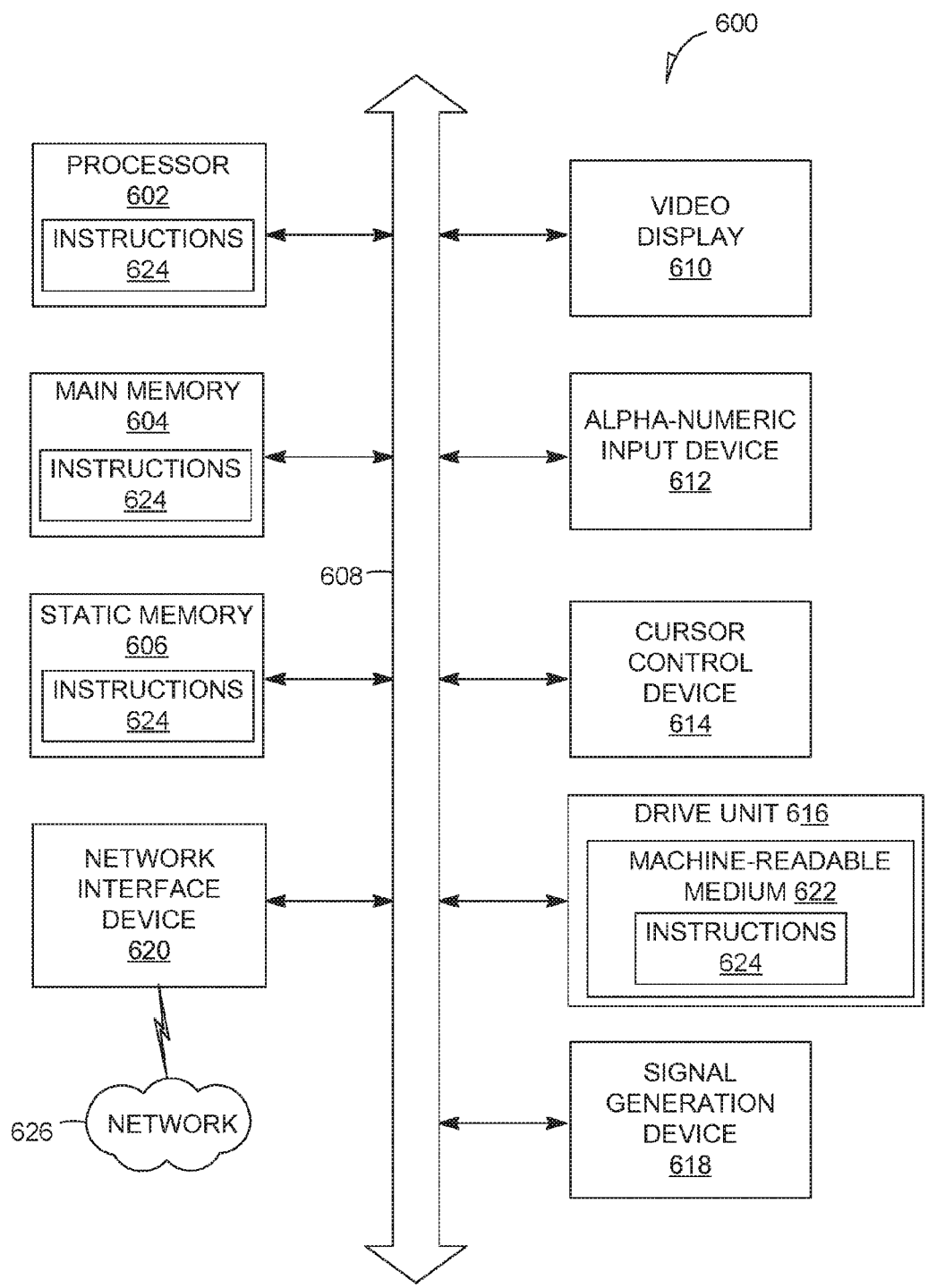
FIG. 6 is a simplified block diagram of a machine in an example form of a computing system within which a set of instructions for causing the machine to perform any one or more of the methodologies discussed herein may be executed.

With reference to FIG. 6, an example embodiment extends to a machine in the example form of a computer system 600 within which instructions for causing the machine to perform any one or more of the methodologies discussed herein may be executed. In alternative example embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, a switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 600 may include a processor 602 (e.g., a central processing unit (CPU), a graphics processing unit (GPU) or both), a main memory 604 and a static memory 606, which communicate with each other via a bus 608. The computer system 600 may further include a video display unit 610 (e.g., a liquid crystal display (LCD) or a cathode ray tube (CRT)). In example embodiments, the computer system 600 also includes one or more of an alpha-numeric input device 612 (e.g., a keyboard), a user interface (UI) navigation device or cursor control device 614 (e.g., a mouse), a disk drive unit 616 a signal generation device 618 (e.g., a speaker), and a network interface device 620.

Machine-Readable Storage Medium

The disk drive unit 616 includes a machine-readable storage medium 622 on which is stored one or more sets of instructions 624 and data structures (e.g., software instructions) embodying or used by any one or more of the methodologies or functions described herein. The instructions 624 may also reside, completely or at least partially, within the main memory 604 or within the processor 602 during execution thereof by the computer system 600, with the main memory 604 and the processor 602 also constituting machine-readable media.

While the machine-readable storage medium 622 is shown in an example embodiment to be a single medium, the term "machine-readable storage medium" may include a single medium or multiple media (e.g., a centralized or distributed database, or associated caches and servers) that store the one or more instructions. The term "machine-readable medium" shall also be taken to include any tangible medium that is capable of storing, encoding, or carrying instructions for execution by the machine and that cause the machine to perform any one or more of the methodologies of embodiments of the present invention, or that is capable of storing, encoding, or carrying data structures used by or associated with such instructions. The term "machine-readable storage medium" shall accordingly be taken to include, but not be limited to, solid-state memories and optical and magnetic media. Specific examples of machine-readable storage media include non-volatile memory, including by way of example semiconductor memory devices (e.g., Erasable Programmable Read-Only Memory (EPROM), Electrically Erasable Programmable Read-Only Memory (EEPROM), and flash memory devices); magnetic disks such as internal hard disks and removable disks; magneto-optical disks; and CD-ROM and DVD-ROM disks.

Transmission Medium

The instructions 624 may further be transmitted or received over a communications network 626 using a transmission medium via the network interface device 620 and utilizing any one of a number of well-known transfer protocols (e.g., HTTP). Examples of communication networks include a local area network (LAN), a wide area network (WAN), the Internet, mobile telephone networks, POTS networks, and wireless data networks (e.g., WiFi and WiMax networks). The term "transmission medium" shall be taken to include any intangible medium that is capable of storing, encoding, or carrying instructions for execution by the machine, and includes digital or analog communications signals or other intangible medium to facilitate communication of such software.

Although an overview of the inventive subject matter has been described with reference to specific example embodiments, various modifications and changes may be made to these embodiments without departing from the broader spirit and scope of embodiments of the present invention. Such embodiments of the inventive subject matter may be referred to herein, individually or collectively, by the term "invention" merely for convenience and without intending to voluntarily limit the scope of this application to any single invention or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Additionally, although various example embodiments discussed above focus on a coded business card on a badge, the embodiments are given merely for clarity in disclosure. Thus, any encoding of information for retrieval and automatic storage to a receiving party's storage device may be considered as being within a scope of example embodiments. Each of a variety of example embodiments is discussed in detail below.

Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present invention. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present invention as represented by the appended claims. The specification and drawings are, accordingly, to be regarded in an illustrative rather than a restrictive sense.

What is claimed is:

1. A method comprising:

accessing, by a hardware processor, a table comprising joined data, the joined data including historical data comprising data based on actions performed by users, data describing each publication, and a determined category for each publication;

determining, by an aggregation module, demand scores based on the joined data;

determining, by an aspect determination module, most relevant aspect name/value pairs for a category based on the determined demand scores;

determining a plurality of publications having at least one of the most relevant aspect name/value pairs for the category, a publication of the plurality of publications being created with at least one of the most relevant aspect name/value pairs in response to a message indicating an aspect name of one of the most relevant aspect name/value pairs and suggesting a user input a corresponding aspect value in response to the user creating the publication; and causing, by a publication engine, the plurality of publications having at least one of the most relevant aspect name/value pairs to be displayed visually distinguished from less relevant publications that exclude the most relevant aspect name/value pairs for the category.

2. The method of claim 1, wherein the causing the plurality of publications to be displayed visually distinguished comprises causing the plurality of publications to be displayed bolded or highlighted.

3. The method of claim 1, further comprising, in response to an indication that a user is creating a new publication within the category, transmitting the message for display on a device of the user, the message indicating the aspect name of one of the most relevant aspect name/value pairs and suggesting the user provide a corresponding aspect value in the new publication.

4. The method of claim 1, further comprising:
compiling the historical data;
accessing the data describing each publication; and
creating the table by joining the historical data with the data describing each publication and the determined category of each listing.

5. The method of claim 2, wherein the determining the most relevant aspect name/value pairs comprises determining an aspect name of one of the most relevant aspect name/value pairs by sorting the determined demand scores in descending order.

6. The method of claim 5, wherein the determining the most relevant aspect name/value pairs comprises sorting the demand scores for the aspect name to determine at least one most relevant aspect value for the aspect name.

7. The method of claim 1, wherein the table comprises categories, aspect names, aspect values, and action counts.

8. The method of claim 1, herein the determining the demand scores is a function of two or more action counts selected from the group consisting of impression counts, click action counts, Buy-it-Now action counts, bid action counts, watch action counts, ask action counts, and offer action counts.

9. A hardware storage device storing instructions that, when executed by one or more processors of a machine, cause the machine to perform operations comprising:
accessing a table comprising joined data, the joined data including historical data comprising data based on actions performed by users, data describing each publication, and a determined category for each publication;
determining demand scores based on the joined data;
determining most relevant aspect/value pairs for a category based on the determined demand scores;
determining a plurality of publications having at least one of the most relevant aspect name/value pairs for the category, a publication of the plurality of publications being created with at least one of the most relevant aspect name/value pairs in response to a message indicating an aspect name of one of the most relevant aspect name/value pairs and suggesting a user input a corresponding aspect value in response to the user creating the publication; and
causing the publications having at least one of the most relevant aspect name/value pairs to be displayed visually distinguished from less relevant publications that exclude the most relevant aspect name/value pairs for the category.

10. The hardware storage device of claim 9, wherein the operations further comprise, in response to an indication that a user is creating a new publication within the category, transmitting a message for display on a device of the user, the message indicating an aspect name of one of the most relevant aspect name/value pairs and suggesting the user provide a corresponding aspect value in the new publication.

11. The hardware storage device of claim 9, wherein the operations further comprise:
compiling the historical data;
accessing the data describing each publication; and
creating the table by joining the historical data with the data describing each publication and the determined category of each listing.

12. The hardware storage device of claim 9, wherein the determining the most relevant aspect name/value pairs comprises determining an aspect name of one of the most relevant aspect name/value pairs by sorting the determined demand scores in descending order.

13. The hardware storage device of claim 12, wherein the determining the most relevant aspect name/value pairs comprises sorting the demand scores for the aspect name to determine at least one most relevant aspect value for the aspect name.

14. The hardware storage device of claim 9, wherein the determining the demand scores is a function of two or more action counts selected from the group consisting of impression counts, click action counts, Buy-It-Now action counts, bid action counts, watch action counts, ask action counts, and offer action counts.

15. A system comprising:
one or more hardware processors; and
a storage device storing instructions that, when executed by the one or more hardware processors, causes the one or more hardware processors to perform operations comprising:
accessing a table comprising joined data, the joined data including historical data comprising data based on actions performed by users, data describing each publication, and a determined category for each publication;
determining demand scores based on the joined data;
determining most relevant aspect name/value pairs for a category based on the determined demand scores;
determining a plurality of publications having at least one of the most relevant aspect name/value pairs for the category, a publication of the plurality of publications being created with at least one of the most relevant aspect name/value pairs in response to a message indicating an aspect name of one of the most relevant aspect name/value pairs and suggesting a user input a corresponding aspect value in response to the user creating the publication; and
causing the publications having at least one of the most relevant aspect name/value pairs to be displayed visually distinguished from less relevant publications that exclude the most relevant aspect name/value pairs for the category.

16. The system of claim 15, wherein the operations further comprise, in response to an indication that a user is creating a new publication within the category, transmitting a message for display on a device of the user, the message indicating an aspect name of one of the most relevant aspect name/value pairs and suggesting the user provide a corresponding aspect value in the new publication.

17. The system of claim 15, wherein the operations further comprise:
   compiling the historical data;
   accessing the data describing each publication; and
   creating the table by joining the historical data with the data describing each publication and the determined category of each listing.

18. The system of claim 15, wherein the determining the most relevant aspect name/value pairs comprises determining an aspect name of one of the most relevant aspect name/value pairs by sorting the determined demand scores in descending order.

19. The system of claim 18, wherein the determining the most relevant aspect name/value pairs comprises sorting the demand scores for the aspect name to determine at least one most relevant aspect value for the aspect name.

20. The system of claim 15, wherein the determining the demand scores is a function of two or more action counts selected from the group consisting of impression counts, click action counts, Buy-It-Now action counts, bid action counts, watch action counts, ask action counts, and offer action counts.

* * * * *

UNITED STATES PATENT AND TRADEMARK OFFICE
CERTIFICATE OF CORRECTION

PATENT NO. : 10,459,919 B2
APPLICATION NO. : 15/375144
DATED : October 29, 2019
INVENTOR(S) : Qian Zhong et al.

Page 1 of 1

It is certified that error appears in the above-identified patent and that said Letters Patent is hereby corrected as shown below:

On the Title Page

Item (57), in Column 2, in "Abstract", Line 6, after "describing" insert -- each --.

In the Claims

In Column 13, Line 34, in Claim 8, delete "herein" and insert -- wherein --, therefor.

In Column 13, Line 37, in Claim 8, delete "-it-" and insert -- -It- --, therefor.

In Column 13, Line 49, in Claim 9, delete "aspect/value" and insert -- aspect name/value --, therefor.

Signed and Sealed this
Fourth Day of August, 2020

Andrei Iancu
*Director of the United States Patent and Trademark Office*